March 28, 1950     J. JOHNSON     2,502,045
FLUID-SUSTAINED AND FLUID-PROPELLED AIRPLANE
Filed April 10, 1946     3 Sheets-Sheet 3
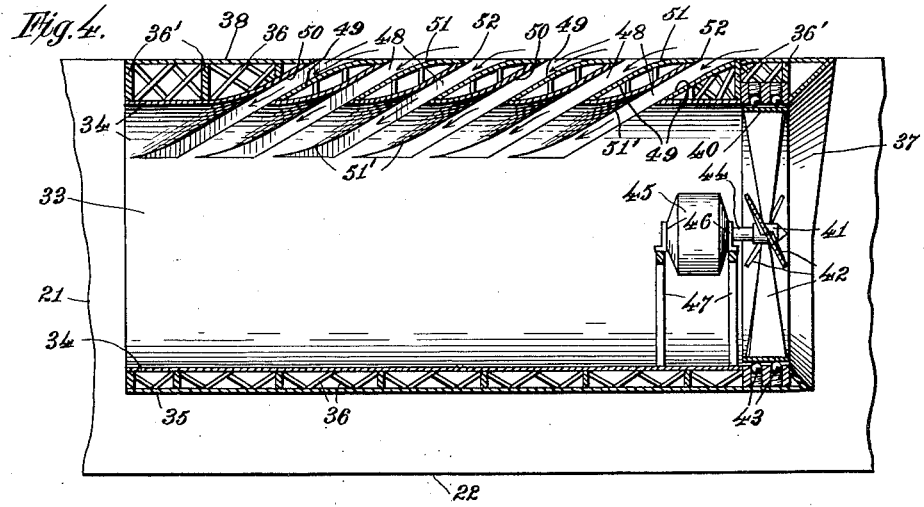
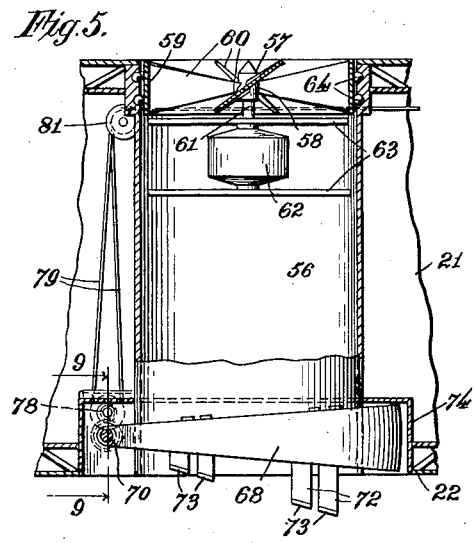
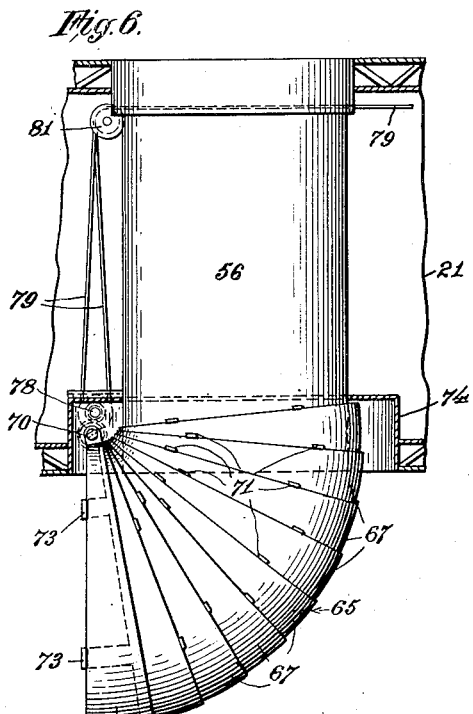
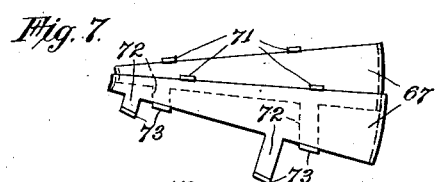
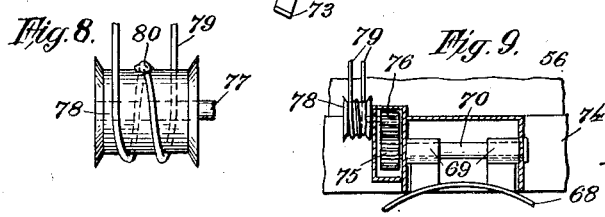
Inventor
John Johnson
by [signature]
Attorney Patented Mar. 28, 1950

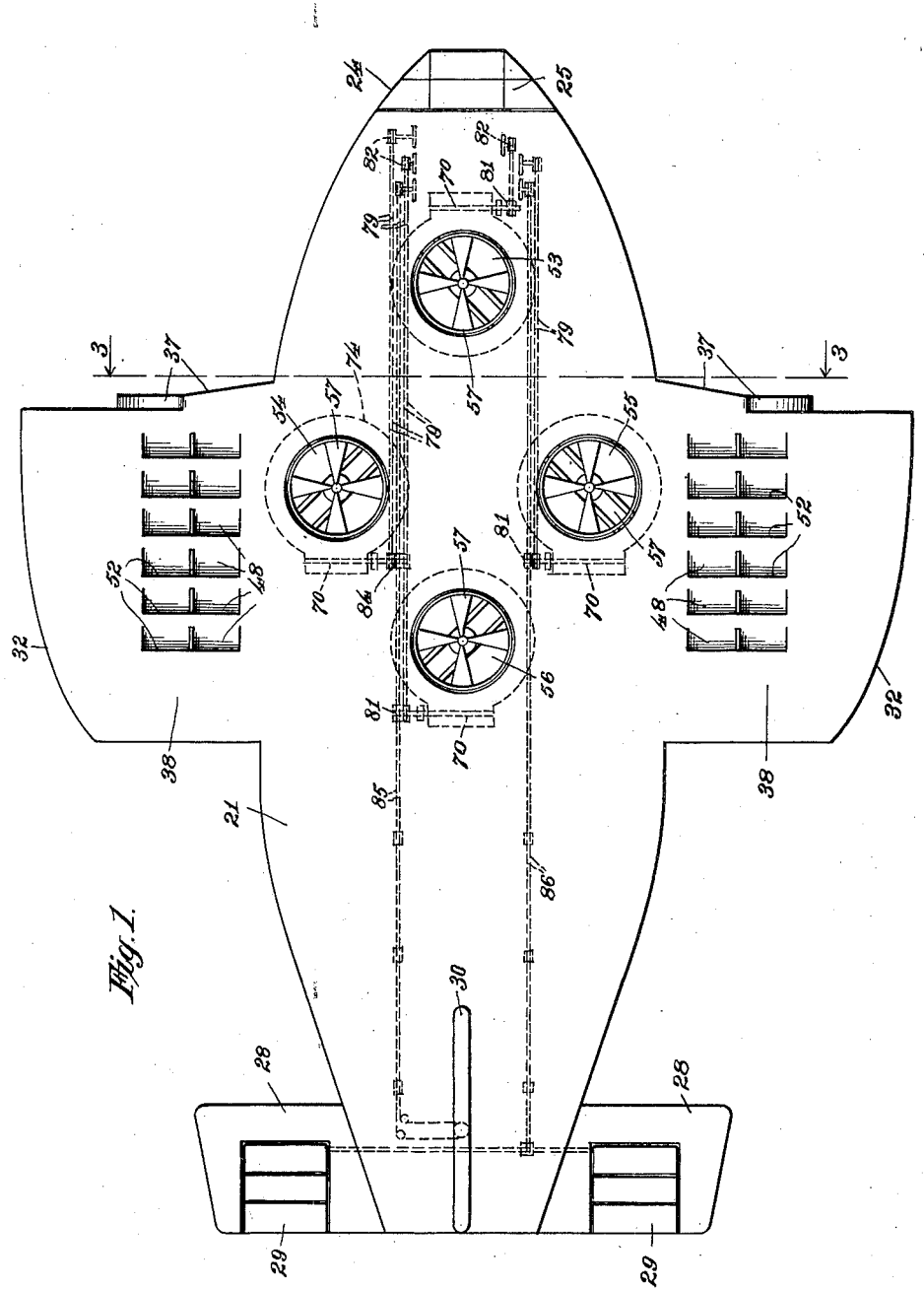

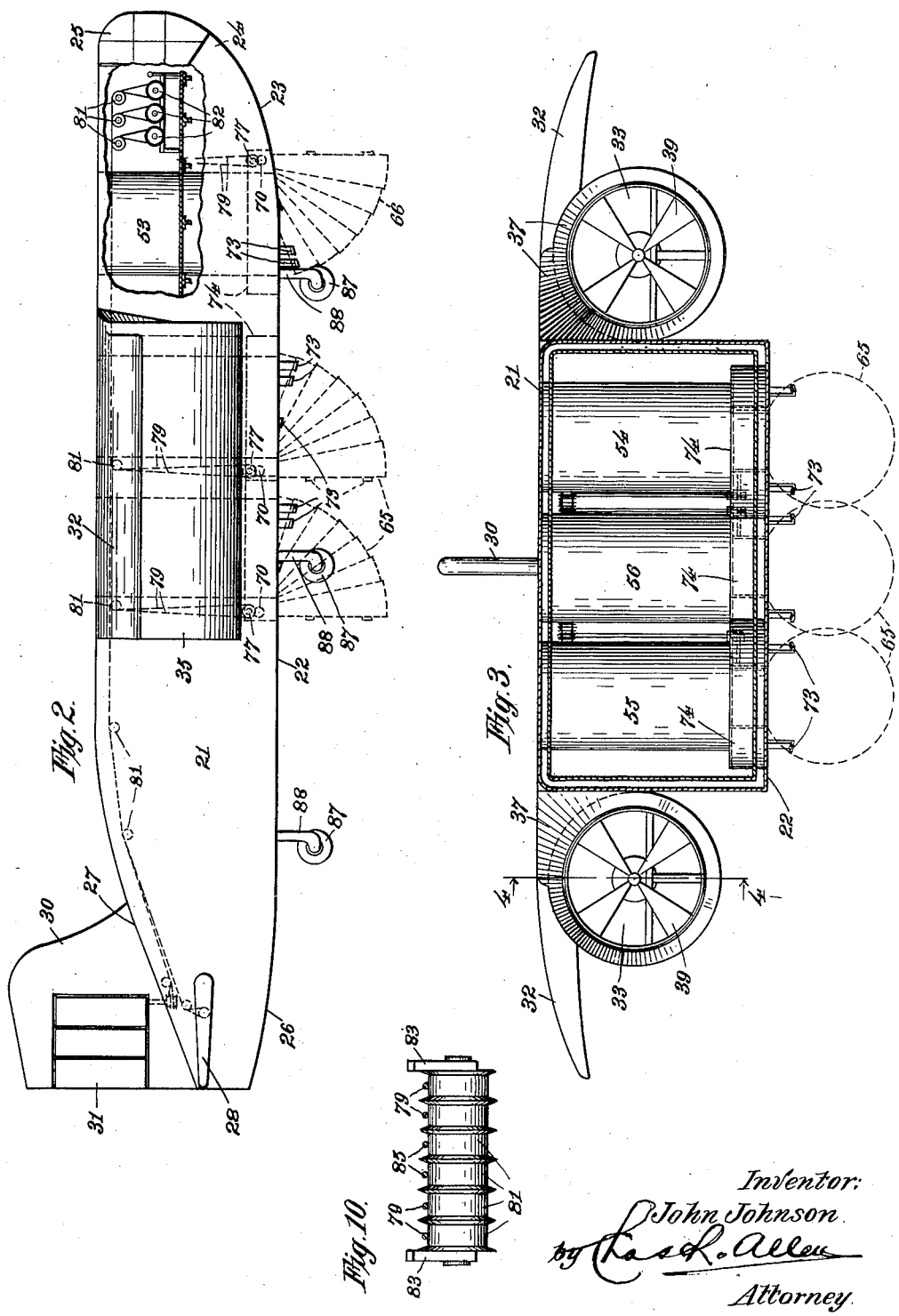

2,502,045

UNITED STATES PATENT OFFICE 2,502,045

FLUID-SUSTAINED AND FLUID-PROPELLED AIRPLANE

John Johnson, Spokane, Wash.

Application April 10, 1946, Serial No. 661,173

5 Claims. (Cl. 244—12)

This invention relates to airplanes, and an object of the invention is to provide an improved airplane capable of attaining a higher altitude with a given load, than other planes of comparable size.

A further object of the invention is to provide in an airplane improved means whereby the plane may take off and land in small, confined spaces.

A further object of the invention is to provide an airplane with means whereby the plane can be made to rise vertically, and said means used, after the plane has risen, to increase the horizontal or forward speed.

Other objects will appear hereinafter.

With these objects in view, my invention consists generally in an airplane comprising a fuselage, laterally extending wings, horizontal longitudinally disposed cylindrical air shafts located under each wing and of uniform diameter throughout, and a propeller within the forward end of said shafts.

The invention further comprises an airplane as above stated with one or more downwardly and rearwardly inclined air ducts extending from the top of the wings above said air shafts into the upper side of said shafts, thereby adding additional air foils to aid in lifting and sustaining the craft.

The invention further consists in an airplane comprising a fuselage, laterally extending wings, and horizontal air shafts under said wings, as above stated, in combination with one or more cylindrical air shafts extending vertically through said fuselage, and each provided with a propeller.

The invention further consists in an airplane having the horizontal and vertical air shafts as mentioned, and further characterized by collapsible elbows at the lower ends of each of the vertical air shafts, which when extended will deflect the air blast from the said shafts from the vertical to the horizontal to either augment the speed of the craft or check the same.

The invention consists further in various details of construction and combinations and arrangement of parts all as will be fully described hereinafter and particularly pointed out in the claims.

The invention will be more readily understood by reference to the accompanying drawings, forming a part of this specification and in which:

Figure 1 is a top plan view of an airplane embodying my invention,

Figure 2 is a side elevation of the same, the collapsible elbows being shown extended in dotted lines, Figure 3 is a transverse section on the line 3—3 of Figure 1 upon an enlarged scale, structural details not germane to the invention being omitted to avoid confusion, Figure 4 is a vertical longitudinal section through one of the horizontal air shafts, on the line 4—4 of Figure 3, and on a further enlarged scale, Figure 5 is a vertical section through one of the vertical air shafts and illustrating the elbow in folded or retracted position, Figure 6 is an elevation of the shaft as shown in Figure 5, with the elbow in extended position, Figure 7 is a detail illustrating two adjacent segments of the elbow, Figure 8 is an elevation of a drum with portion of attached cable, used in operating the collapsible elbows, Figure 9 is a detail section on the line 10—10 of Figure 5, and Figure 10 is a detail of one of the roller assemblies used in supporting the control cables.

Referring to the drawings, 21 indicates the fuselage of the airplane, which is preferably rectangular in cross section, and having its longest dimension extending longitudinally of the craft. The bottom 22 is flat and extends horizontally for the major portion of the length of the fuselage, constituting an airfoil to assist in sustaining the plane while in flight. The forward end of the bottom is curved upwardly as at 23 to the nose 24, which is adjacent the top of the fuselage and provided with suitable wind shields 25. At the rear end, the bottom curves slightly upwardly as at 26, and the top curves downwardly as at 27.

At the rear end the plane is provided with the usual horizontal stabilizers 28, having the elevators 29; and with a vertical fin 30 having the rudders 31.

Extending laterally from the fuselage are wings 32, the upper surfaces of which are continuations of the upper face of the fuselage. These wings cup slightly downwardly toward the tips as shown in Figure 1 of the drawings.

Arranged under each wing 32, and close against the fuselage, is a horizontal air shaft 33, having inner and outer spaced walls 34 and 35 respectively, braced by suitable framework 36, some portions of which, particularly the beams 36' at the top, constitute part of the wing and fuselage framing thereby securing the parts into a unitary whole.

At the forward ends of the air shafts 33 are provided funnellike structures 37 which extend over the area between the front ends of the walls 34 and 35 and between the wall 34 and the upper wall or skin 38 of the wings, thereby materially reducing the air resistance, and directing larger quantities of air into the shafts 33.

The shafts upon opposite sides of the fuselage are substantially identical so that the description of one will suffice for both. In the forward end of the shaft, which is of uniform diameter throughout its length, is arranged a propeller 39. This comprises a cylindrical outer rim or band 40, a hub 41 and a plurality of blades 42 welded or otherwise secured to the hub and rim. The pitch of the blades is greatest at the hub and gradually lessens toward the rim 40; and the width of the blade increases from the hub to the rim. By this construction no air is thrown off tangentially to the path of the ends of the blades, and a spiral of air is driven through the shaft 33 which is denser at the portion adjacent the wall 34, and with a center of partial vacuum, or below atmospheric pressure. This also gives less loss of thrust through slip stream action than with methods heretofore devised.

Ball bearings 43 are provided for the rim 40 as illustrated in Figure 4. The hub 41 is mounted on a shaft 44 of a motor 45, and said motor is supported by brackets 46 secured on a suitable supporting frame 47.

Extending diagonally downwardly and rearwardly from the upper surface of the wings and into the upper portion of the air shaft 33, are a plurality of air ducts 48, each defined by a forward or front plate 49 and a rearward or back plate 50. The upper ends of the plates 49 are curved or flared forwardly as at 51 which facilitates entry of air from above the wing into said ducts and the lower edges of the plates 50 are curved rearwardly as at 51. Air passing rapidly over the upper face of the wing is deflected downwardly by the forward upper edges 52 of the plates 50 as indicated by arrows in Figure 4. This lessens the air pressure above the wings and the plates 50 serve as additional airfoils for lifting and sustaining the craft.

Not only do the walls of the ducts 48 deflect the air into the air shaft 33, but the rapidly moving spiral air column in the shaft draws the air into the ducts. Suitable framing and trusses are provided to strengthen the wings and the plates 49 and 50, as shown, but specific description thereof is not believed essential as these may be varied according to the specific design of the device.

Extending vertically through the fuselage 21 is a plurality of similar cylindrical air shafts. In the drawings four such shafts are illustrated, although any number may be used. The four air shafts shown in the drawings are designated by the reference numerals 53, 54, 55 and 56. Shaft 53 is located forward of the wings and toward the nose of the airplane. The other three are preferably located between the wings; two of them, 54 and 55 abreast and equidistant each side of the median line of the craft, and 56 on the median line and slightly aft of shafts 54 and 55. As these vertical shafts are substantially identical, a detailed description of one is believed to be sufficient, and shaft 53 has been selected for such description.

Referring to Figures 5 to 7 inclusive of the drawings, the shaft 56 is cylindrical and of uniform diameter throughout its length. In the upper end of said shaft is a propeller 57 similar to the propellers 38, and comprising a hub 58, a cylindrical outer rim 59, and a plurality of blades 60 secured to both the hub and the rim as by welding. The description of the pitch of the blades 39 of the propellers 39 associated with the horizontal air shafts 33, as hereinbefore set forth, applies to the propellers in the vertical shafts and a repetition thereof would be superfluous. The hub 58 is mounted on a vertical shaft 61 of a motor 62 supported on suitable framework 63; and ball bearings 64 are provided for the rim 59 of the propeller.

The air shafts 53 to 56 inclusive, with the associated propellers provide means whereby the airplane may be lifted directly upwardly so as to take off from locations where runways are inadequate or entirely missing; or they may assist the propellers 39 for a quick take off, particularly when the plane is carrying a heavy load. Also, by these means, the plane may hover over a fixed location; and may land by settling directly downwardly. Furthermore, by aid of these propellers a higher altitude may be reached even with a great load than with a plane not so equipped.

Means are also provided whereby the lifting force of the vertical shafts and propellers may be utilized to increase the direct drive speed of the plane; or used to check the momentum.

To this end, collapsible elbows are provided at the lower ends of the vertical shafts which may be operated when desired to divert the downwardly directed column of air into a horizontal direction, either to augment the speed of the plane when directed rearwardly, or check the speed when the air is directed forwardly. Preferably, the elbows in the shafts 54, 55 and 56 are arranged to direct the air rearwardly, as shown in dotted lines at 65 in Figure 2, whereas the elbow on the shaft 53 is adopted to direct the blast forwardly to serve as a break, as shown in dotted lines at 66 in the same figure.

These elbows are each formed of a plurality of similar telescoping segments 67 and a master segment 68 the latter being provided with sleeves 69 keyed to a pivotal shaft 70. The segments 67 are each provided with means to limit the relative movements of the next adjacent segment. For this purpose the upper edge of each of said segments is provided with outturned stops or lugs 71 to engage the upper edge of the adjacent segment; and with depending arms 72 having outturned lugs 73 to engage under the edge of the same segment. This is illustrated in Figure 7 of the drawings. These lugs are arranged in pairs in the edges of the segments, and the pairs in adjacent segments are staggered so as to avoid interference with any segment but the next adjacent one. The master segment is not provided with the lugs 71 and 73 but moves between such lugs on the adjacent segment. Means, which are to be presently described, are provided for swinging the master segment 68 to either extend or retract the elbow. When the master segment is lowered, as in Figure 6, the segments 67, with the exception of the innermost segment which is fixed in place about the lower end of the air shaft, move downwardly with said master segment until each successive segment engages and is stopped by the lugs 73 of the next preceding segment. To retract the elbow into the position illustrated in Figure 5, the master segment is swung upwardly, and the upper edge of each segment in order engages the lugs 71 on the inner adjacent segment until all are lifted into fully retracted position as shown in Figure 5. Preferably, an annular housing 74 is provided surrounding the lower end of the air shaft, for housing the folded and retracted elbow.

To operate the master segment 68, the shaft 70 is provided with a gear 75 meshing with a pinion 76 on a shaft 77 carrying a drum 78 to which is attached an operating cable 79. The cable 79 has the necessary laps around the drum 78 and is preferably welded to the drum as at 80 to avoid any slippage. The cable passes over suitable sleeve rollers 81 to control drums 82 in the instrument room in the nose of the craft.

The sleeve rollers 81 are preferably mounted in brackets 83 depending from the top of the fuselage and the brackets 83 carry a separate roller for each cable from the controls to the parts to be actuated, such as the elbows above described; together with the elevators and rudders. In Figure 10 is illustrated a roller assembly for six cables, such as would be located at 84 in Figure 1, where they support the two laps 85 of the cable to the rudder 31, two laps of the cable to the elbow on air shaft 54, and two laps of the cable to the elbow on air shaft 56. Cables to the elevators 29 are indicated at 86.

The landing gear shown in the drawing comprises the usual wheels 87 mounted on brackets 88, which may be lowered into operative position as shown in Figure 1, or retracted when not in use, by any approved means, not shown, operable by the pilot from the forward end of the plane.

By providing a wing type air ship with the vertical air-shafts and associated propellers and motors, the craft may be operated either as an airplane, a helicopter, or as both combined. In taking off, if there is no convenient runway, the vertical motors may be used so as to rise directly upwardly. Where there are runways available, but too short considering the load, both the vertical and horizontal motors may be used simultaneously. After the plane has reached the desired altitude it may hover over any spot desired by shutting off the horizontal motors and maintaining the vertical motors in operation. Also, when the plane is traveling forwardly, under the propulsion of the horizontal motors, greater speed may be attained by using the vertical motors and lowering those collapsible elbows which will direct the air blasts rearwardly. To check the speed of the plane, the elbow or elbows which direct the air blasts forwardly may be lowered, as is obvious. Furthermore, greater loads may be carried than with the usual airplane of comparable size, due to the vertical motors, and also to the additional air foils provided by the air ducts 48 and the rear walls 50 thereof.

While a specific form of the invention is above described, it is to be understood that various changes in details of construction and combination of parts may be made therein without departing from the scope of the invention as set forth in the accompanying claims.

I claim:

1. In an airplane, a fuselage, wings extending laterally therefrom, means for propelling said plane forwardly, an air shaft extending vertically through said fuselage, a motor in said shaft for directing an air blast downwardly, a collapsible elbow at the lower end of said air shaft and forming a continuation thereof, said elbow comprising a plurality of similar telescoping segments, means for collapsing and extending said elbow, and an annular housing within said fuselage and surrounding the lower end of said air shaft to receive said elbow when collapsed.

2. In an airplane, a fuselage, an air shaft extending vertically therethrough, a propeller in said air shaft for directing an air blast downwardly, a collapsible elbow at the lower end of said air shaft comprising a plurality of similar telescoping segments and a master segment, the innermost of said segments being fixed about the lower end of said air shaft and within the fuselage, a transverse shaft, a fixed connection between said transverse shaft and said master segment, and means on the edges of said segments limiting the movements thereof in both directions relative to the contiguous segments, and means for actuating said transverse shaft to collapse and extend said elbow.

3. In an airplane, a fuselage, an air shaft extending vertically therethrough, a propeller in said air shaft for directing an air blast downwardly, a collapsible elbow at the lower end of said air shaft comprising a plurality of similar telescoping segments and a master segment, the innermost of said segments being fixed about the lower end of said shaft, a transverse shaft, a fixed connection between said transverse shaft and said master segment, outturned lugs on the upper edges of said segments to be engaged by the upper edges of the adjacent segment when the elbow is in retracted position, and depending arms on the lower edges of each segment provided with outturned lugs to engage the lower edges of the next lower segment when in extended position.

4. A device as set forth in claim 3 in which the lugs are arranged in pairs on said segments, and the pairs on adjacent segments being staggered.

5. A device as set forth in claim 2, in combination with a housing within said fuselage and surrounding the lower end of said air shaft into which said elbow is received when collapsed.

JOHN JOHNSON.

REFERENCES CITED

The following references are of record in the file of this patent:

UNITED STATES PATENTS

| Number | Name | Date |
|---|---|---|
| 1,012,540 | George | Dec. 19, 1911 |
| 1,082,750 | Jacomy | Dec. 30, 1913 |
| 1,438,686 | Belcher | Dec. 12, 1922 |
| 1,547,656 | Klinker | July 28, 1925 |
| 1,645,612 | Miller | Oct. 18, 1927 |
| 1,669,495 | Sloan | May 15, 1928 |
| 1,697,770 | Kreikenbohm | Jan. 1, 1929 |
| 1,749,959 | Read | Mar. 11, 1930 |
| 1,781,455 | Glanschnig | Nov. 11, 1930 |
| 1,828,253 | Maiwurm | Oct. 30, 1931 |
| 1,873,505 | Stipa | Aug. 23, 1932 |
| 1,906,114 | Silverman | Apr. 25, 1933 |
| 1,980,246 | Austin | Nov. 13, 1934 |
| 2,062,018 | Wheeler | Nov. 24, 1936 |
| 2,077,471 | Fink | Apr. 20, 1937 |